United States Patent [19]

Jovick et al.

[11] Patent Number: 4,510,408
[45] Date of Patent: Apr. 9, 1985

[54] MOUNTING DEVICE FOR CYLINDRICAL MAGNETIC SENSOR

[75] Inventors: Raymond J. Jovick, Troy; Roger J. Malott, Union Lake; Thomas E. Evans, Farmington Hills, all of Mich.

[73] Assignee: Rockwell International Corporation, Pittsburgh, Pa.

[21] Appl. No.: 912,789

[22] Filed: Jun. 5, 1978

Related U.S. Application Data

[63] Continuation of Ser. No. 734,149, Oct. 20, 1976, abandoned, which is a continuation of Ser. No. 577,243, May 13, 1975, abandoned.

[51] Int. Cl.³ .............................................. H02K 21/26
[52] U.S. Cl. ...................................... 310/168; 324/173
[58] Field of Search ............................. 310/168, 155; 329/170–173

[56] References Cited

U.S. PATENT DOCUMENTS 3,793,545  2/1974  Leiber et al. ...................... 310/168
3,890,517  6/1975  Marsh et al. ...................... 310/168
3,911,302  10/1975  DeClaire ........................... 310/168

Primary Examiner—Donovan F. Duggan

[57] ABSTRACT

A magnetic sensor mounting device is used in a wheel speed sensor assembly which has an annular rotor coaxially aligned with and connected to the wheel for rotation therewith and a generally cylindrical magnetic sensor to be fixedly mounted on the axle assembly. A support structure for the magnetic sensor includes a resilient plastic sleeve member which is generally cylindrical to closely encircle the magnetic sensor. An adjusting nut of the support structure acts on a tapered end of the sleeve member to inwardly wedge the sleeve member against the magnetic sensor to produce frictional contact therebetween for retention of the magnetic sensor at a desired axial location.

10 Claims, 3 Drawing Figures

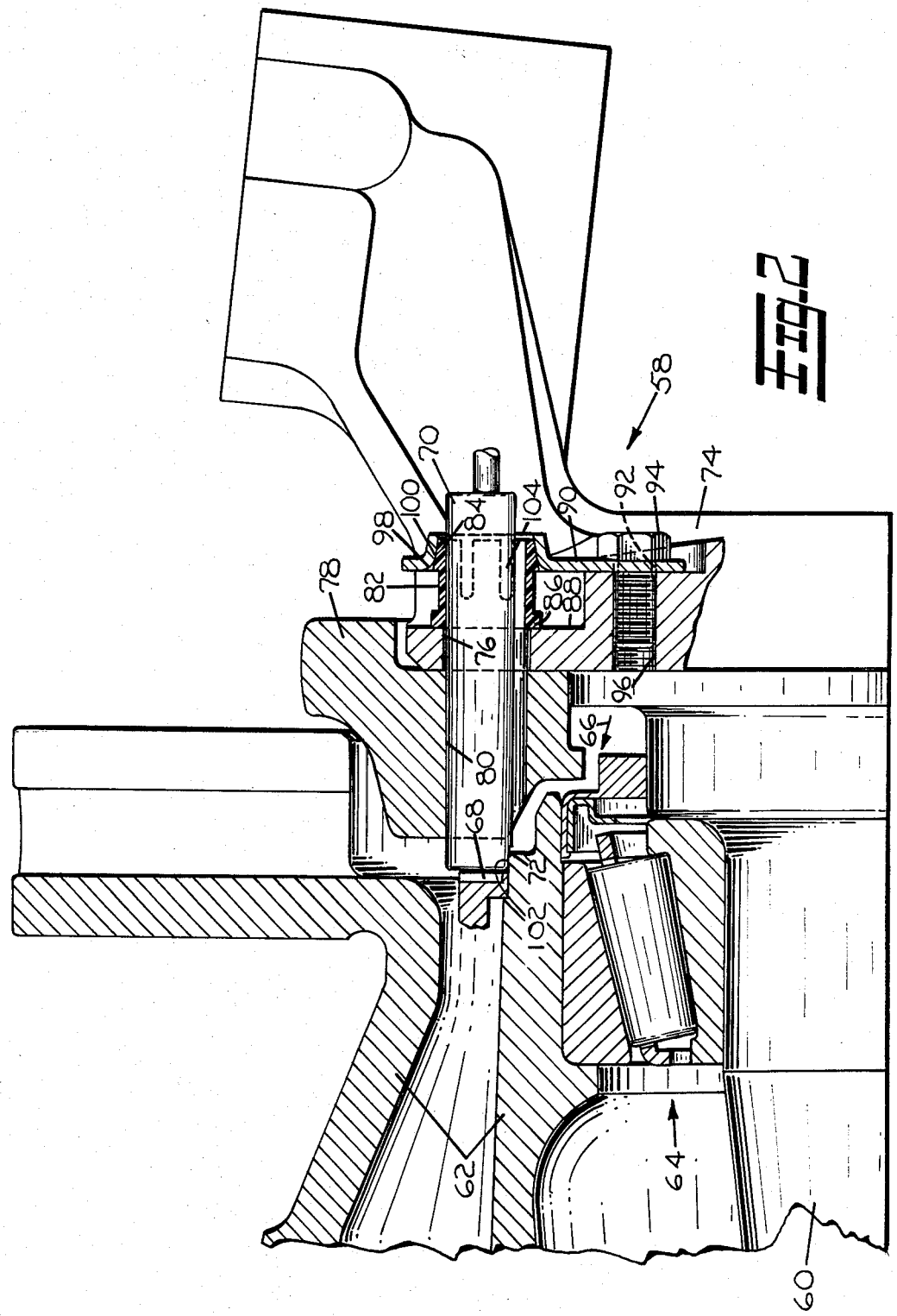

MOUNTING DEVICE FOR CYLINDRICAL MAGNETIC SENSOR

This is a continuation of application Ser. No. 734,149, filed Oct. 20, 1976 now abandoned which is a continuation of application Ser. No. 577,243 filed on May 13, 1975, abandoned.

BACKGROUND OF THE INVENTION

1. Field of the Invention

This invention relates to a cylindrical wheel speed sensor and, more specifically, to a mounting device for such a sensor which enables the sensor to be utilized in a variety of wheel configurations while maintaining accurate positioning thereof for reliable operation.

2. Description of the Prior Art

Modern anti-lock vehicle brake control systems operate in response to electrical signals indicative of the angular velocity of one or more of the vehicle wheels. Usually these signals are derived from an electromagnetic sensor, including a magnet carried by a stationary portion of the vehicle such as the axle housing and a toothed or notched metal ring which rotates with the wheel opposite the magnet. As the ring teeth pass the magnetic sensor device, the resulting variations in flux produce a voltage, the frequency of which is a function of the angular velocity of the wheel and number of teeth in the ring.

To produce the required voltage level of the velocity signal, the sensor and ring must be accurately located with respect to each other during initial assembly and must remain in a preselected relationship even after extended operation in which the components are subjected to road shocks and constant vibration. It is also essential that installation of the sensor assembly be accomplished in a manner adaptable to mass production methods to minimize the need for skilled technicians and elaborate installation techniques.

Further, to satisfy an ever increasing demand for brake control systems, it has become necessary to provide sensor-rotor systems to a variety of existing wheel configurations. Consequently, to simplify and standardize the sensors, a generally cylindrical housing has been provided which has overall dimensions to accommodate installation at various locations as desired for the particular wheel assembly. The means for mounting this sensor must insure that the above mentioned relationships can be obtained during installation and retained during vehicle operation.

There have heretofore been utilized wheel speed sensors, such as those disclosed in U.S. Pat. Nos. 3,769,534, 3,772,548, 3,772,549, and 3,774,061, in an effort to provide overall configurations which satisfy some of the above stated requirements.

SUMMARY OF THE INVENTION

Accordingly, it is an object of this invention to provide a novel magnetic sensor mounting device in which the sensor can be readily adjusted to a predetermined precise relationship with the rotor during initial installation and maintained in that predetermined relationship during operation of the vehicle.

It is another object of the invention to provide a magnetic sensor mounting device of the type described which is inexpensive to produce and simple to install.

It is a further object of the invention to provide a magnetic sensor mounting device of the type described which may be readily adapted for use in a variety of existing wheel configurations.

To accomplish these and other objects of the invention, a preferred embodiment thereof includes a magnetic sensor mounting device for a wheel speed sensor assembly. The assembly is capable of being installed in association with a wheel rotatably mounted on an axle. The wheel speed sensor assembly includes an annular rotor means coaxially aligned with and connected to the wheel for rotation therewith and a generally cylindrical magnetic sensor alignable with a sensor of the annular rotor means. The preferred magnetic sensor mounting device includes a support structure for the magnetic sensor which is adapted to be fixedly mounted on the axle assembly in alignment with the annular rotor means. A resilient plastic sleeve member has a generally cylindrical opening to closely receive the magnetic sensor therein. The sleeve member has an outer surface at a first end thereof which is gradually tapered inwardly. The support structure includes a means for selectively applying an axial force to the sleeve member when the magnetic sensor is positioned at a predetermined actual location therein to inwardly wedge the sleeve member against the magnetic sensor to produce frictional contact therebetween. Consequently, the application of the actual force will maintain the magnetic sensor at the predetermined axial location.

BRIEF DESCRIPTION OF THE DRAWINGS

FIG. 2 is a fragmentary view of another wheel assembly, partly in section, including an alternative embodiment of the invention.

DETAILED DESCRIPTION OF THE PREFERRED EMBODIMENTS

Figure 1:
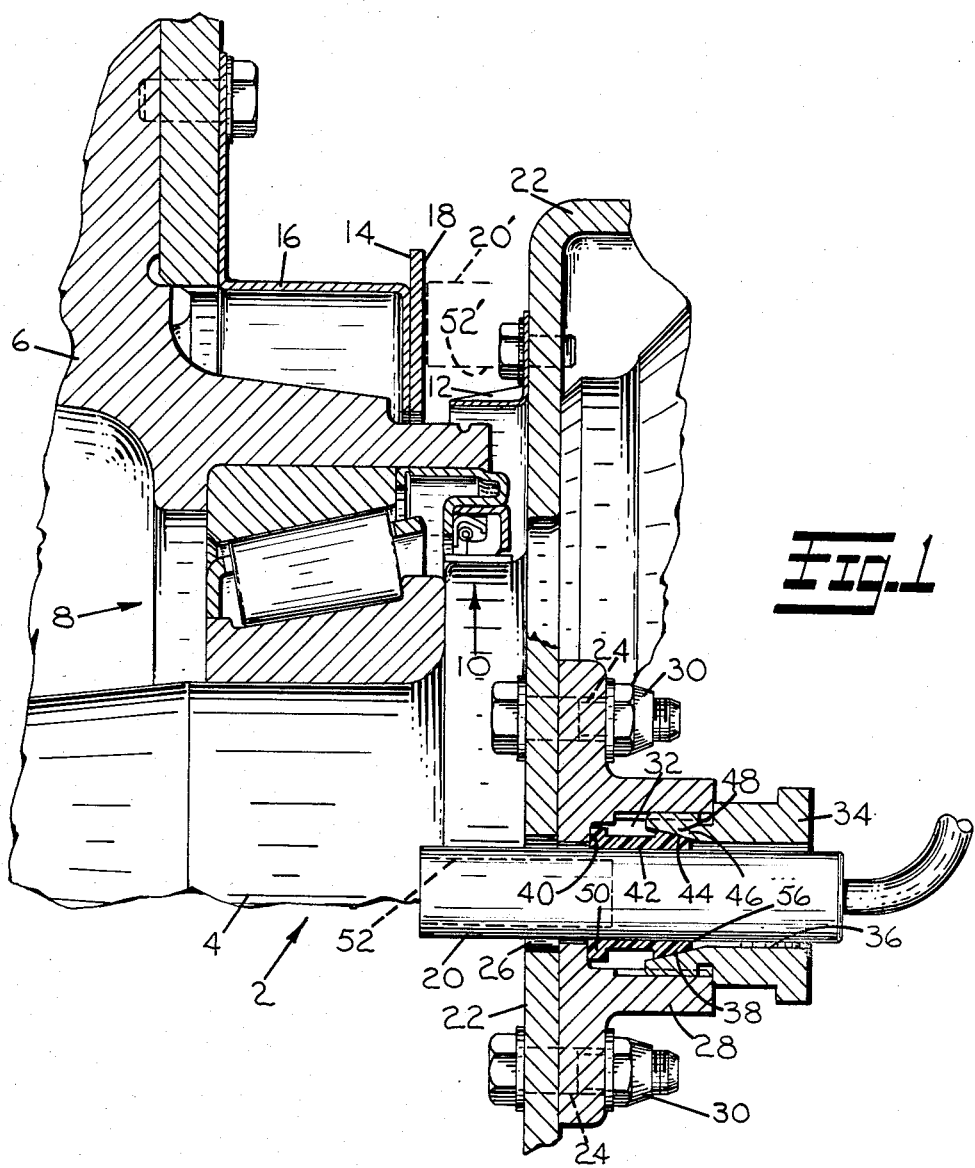
FIG. 1 is a fragmentary view of a wheel assembly, partly in section, including the preferred embodiment and showing various features of the invention.

As seen in FIG. 1, by a fragmentary view thereof, a front axle assembly 2 includes a steering spindle 4. A wheel 6 is mounted for rotation about the spindle 4 to include a wheel bearing assembly 8, a bearing seal 10 and an oil slinger 12 in a general configuration which is well known in the art. A rotor 14 is mounted to the wheel 6 by a rotor support frame 16 so that the rotor 14 is coaxially aligned with the wheel. The rotor 14 is annular and includes a surface 18 which is toothed or notched to provide the desired signal as described hereinabove.

A magnetic sensor 20 which is adapted for alignment with the surface 18 is generally cylindrical in shape. In the preferred installation of FIG. 1, the sensor 20 is to be fixedly mounted to the axial assembly in alignment with the surface 18 of rotor 14 for detection of the relative rotation therebetween. The general alignment can be best seen at 20'.

To provide support for the sensor 20, a wheel backing plate 22 which is fixedly mounted on the spindle 4 is provided in the preferred embodiment with a pair of bolt holes 24 and a sensor receiving cavity 26. A support housing 28 is adapted to be secured to the wheel backing plate 22 by a pair of nut and bolt assemblies 30. The support housing 28 includes a central cavity 32 which is aligned with the sensor receiving cavity 26 of the backing plate 22. The central cavity 32 of the housing 28 is threaded to receive an adjusting nut 34. The adjusting nut 34 also includes a centrally located cavity 36 so that the sensor 20 may be received within the aligned cavities 26, 32 and 36.

A generally tubular sleeve member 38 is adapted to be received within the central cavity 32 between a shoulder 40 of the cavity 32 and the adjusting nut 34. An interior passageway 42 of the sleeve member 38 is generally shaped and dimensioned to closely encircle the sensor 20. The sleeve member 38 is formed of a resilient plastic material which has, for example, been found to work satisfactorily to insure that the sleeve member 38 may be inwardly wedged against the sensor 20 without significant compression in the axial direction.

Characteristically, at a first end 44 of the sleeve member 38, the outer surface 46 of the sleeve member 38 is gradually tapered inwardly. Further, the centrally located cavity 36 of the adjusting nut 34 is at its inward end 48 generally conical to mate with the first end 44 of the sleeve member 38. It can be seen from FIG. 1 that with the sensor 20 positioned within the support housing 28, the application of an axial force on the sleeve member 38 by adjusting rotation of the adjusting nut 34 will tend to wedge the first end 44 of the sleeve member 38 inwardly to make gripping, frictional contact with the sensor 20. The force created by the cooperation of the sleeve member 38 and the adjusting nut 34 has been found to effectively prevent any undesired axial movement of the sensor 20. Since the sleeve member 38 is generally noncompressible, the application of axial force by the adjusting nut 34 presses the second end 50 against the shoulder 40 of the central cavity 32. However, since the sleeve member 38 is generally noncompressible, the axial force is transferred through resulting forces acting on the tapered outer surface 46 to cause the first end 44 to be generally wedged inwardly against the sensor 20.

An understanding of the installation requirements for the mounting device of the present invention will demonstrate other advantages which the configuration of the preferred embodiment provides. With the rotor 14 installed on the wheel 6 and the support housing 28 generally installed on the wheel backing plate 22, it is essential to properly, axially position the sensor 20 with respect to the rotor 14. Although not shown in FIG. 1, the sensor 20 includes two sensor elements which may be circumferentially aligned with the surface 18 of the rotor 14. Accordingly, one section of the generally cylindrical magnetic sensor 20 is flat as is indicated at 52 and 52'. By providing a matching flat section on the cavity 26 and/or the cavity 32, the flat section 52 of the sensor 20 insures proper alignment and orientation thereof. With the adjusting nut 34 loose, the sensor 20 can be received within the sleeve member 38 and inwardly positioned against the surface 18 of the rotor 14. Hand tightening the adjusting nut 34 then allows a limited wedging contact by the end 44 to generally restrict actual movement of the sensor 20 without preventing it. The wheel 6 is then rotated to cause the surface 18 of the rotor 14 to act against the sensor 20 to position it to the right as may be necessary because of slight rotor misalignment or imperfections. Consequently, the sensor 20 will be positioned at a location adjacent the surface 18 without continuous contact therewith or an application of a force therebetween. Tightening of the adjusting nut 34 will generate sufficient frictional contact between the sleeve member 38 and the magnetic sensor 20 to prevent axial movement from this desired location.

It should be noted that the tapered configuration of the preferred sleeve member particularly satisfies these installation requirements. Generally, the sleeve member 38 acts during the installation as a one-way clutch on the sensor 20. When a moderate force is applied to the first end 44, the smooth surface of the interior passageway 42 allows some movement to the right. However, the leading edge 56 of the first end 44 will have a tendency to grip the sensor 20 to prevent its accidental movement to the left during adjusting nut tightening.

Turning to FIG. 2, it can be seen that a different front axle assembly 58 includes a steering spindle 60. Similarly, a wheel 62 with an appropriate wheel bearing assembly 64 and bearing seal 66 is again installed on the spindle 60. There is also associated with the wheel 62 a rotor 68. Although the mounting means is not shown, the rotor 68 is again mounted coaxially with the wheel 62 for rotation therewith.

A generally cylindrical magnetic sensor 70 is provided for this alternative installation but includes, for manufacturing reasons, a flat surface 72 which extends throughout its length. For this alternative installation, the steering knuckle structure 74 is provided with a hole 76 therethrough for receiving the sensor 70 in a position for alignment with the rotor 68. For added sensor support, installed alignment through a brake spider 78 is provided. The brake spider 78 is secured to the steering knuckle structure 74 and includes an opening 80 therethrough which is aligned with the hole 76.

To restrict axial movements of the sensor 70, a resilient plastic sleeve member 82 is again employed and includes a first end 84 which is tapered. When the sleeve member 82 is positioned about the sensor 70, a second end 86 thereof is positioned against the surface 88 of the steering knuckle structure 74. To provide the axial force needed to wedge the first end 84 of the sleeve member 82 against the sensor 70 in this configuration, a preformed cantilever spring member 90 is provided. The spring member 90 is stamped and formed of sheet spring metal to include a first end 92 having a hole therethrough so that it may be anchored to the steering knuckle structure 74 by a bolt 94 which is received within a threaded hole 96 in the structure 74. A hole is punched in the other end 98 of the spring member 90 so that an interior flange 100 may be formed. The interior flange 100 is generally tapered and dimensioned to mate with the tapered first end 84 of the sleeve member 82. The location of the anchored end 92 of the spring member 90 and the general dimensions of the sleeve member 82 and the spring member 90 insure that when the bolt 94 is fully received within the threaded hole 96, the spring member 90 will be sufficiently wedged to generate a biasing force at the interior flange 100 for proper wedging contact by the first end 84 of the sleeve member 82.

Installation of the sensor 70 is similar to that of the sensor 20 described hereinabove. When initially inserted through the steering knuckle structure 74, the orientation of the sensor 70 is obtained, however, by positioning the flat surface 72 against a circumferential surface 102 of the wheel 62. When the end of the sensor 70 is against the rotor 68, the bolt 94 is tightened to provide some restriction to sensor movement by the first end 84 of the sleeve member 82. Rotation of the wheel 62 again positions the sensor 70. Continued tightening of the bolt 94 generates sufficient force through the interior flange 100 and the first end 84 of the sleeve member 82 to prevent axial movement of the sensor 70 from its desired position.

In this configuration of FIG. 2, it can be seen that the present invention will accommodate sensors which do not have a circular cross-section at the first end 84 of the sleeve member 82. Although a sleeve member of the type utilized in the embodiment of FIG. 1 might also be utilized in that of FIG. 2 to provide sufficient retention force, the sleeve member 82 has been altered to show an alternate means for accommodating sensors which do not have a circular cross-section. As can be seen at 104, the first end 84 of the sleeve member 82 has been formed into extended sections which are divided by slots so they may be individually wedged inwardly to retain a sensor. The sleeve member 82 therefore is presented, by way of example, as a means whereby a sensor which is only generally cylindrical may be retained by use of the present invention. It should also be clear that if one wishes to simply accommodate sensors having different diameters, for example, those made with larger tolerances to decrease manufacturing costs, a single slot may be used. The single slot would beneficially be located at the first end 84 but might also extend longitudinally for the entire length of the sleeve member.

To further demonstrate the versatility and adaptability provided by the present invention, the disclosure provided in U.S. Pat. No. 3,772,548, which is hereby incorporated by reference, should be considered. U.S. Pat. No. 3,772,548 discloses a sensor and wheel configuration which includes a sensor module 48 which is rigidly mounted on a suitable bracket assembly 60 in alignment with a rotating rotor ring 42. The disclosure includes an explanation of how the sensor module is positioned outwardly toward the wheel so that the rotor ring 42 will make contact with the sensor module 48 when the wheel is installed. The sensor module 48 is moved inwardly by the rotor ring 42 to provide the desired position for operation. Accordingly, the sensor module 48 is inaccessible after the wheel is installed so that adjustments must be made automatically rather than by the methods described hereinabove.

However, it has been found that the cylindrical sensors and the mounting device of the present invention can be utilized in the wheel-sensor configuration of U.S. Pat. No. 3,772,548 while providing an additional important feature. Because of the limited space requirements for the cylindrical sensor and the mounting device of the present invention, it has been found that two sensors could be utilized to replace the one sensor which was previously utilized for anti-skid control alone. There is presently being expressed an increased interest in electronic speedometers and the second sensor of this improved configuration provides a separate signal for this added purpose.

Figure 3:
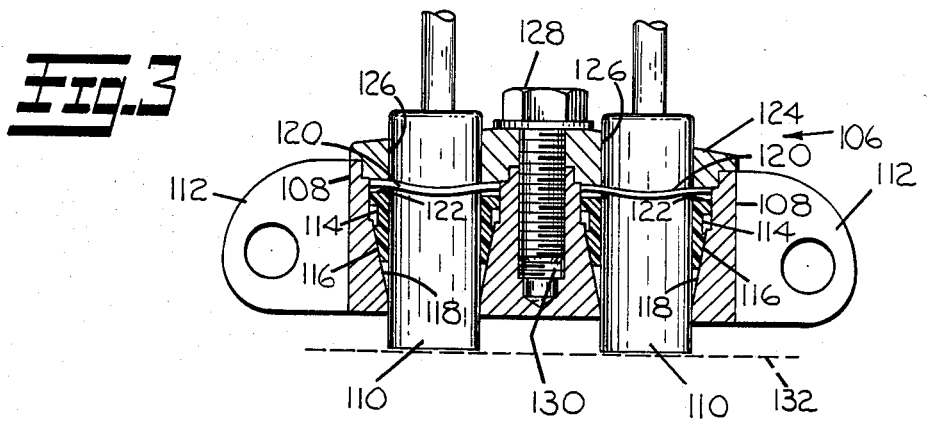
FIG. 3 is a sectional top view of another alternative embodiment of the invention.

As seen in FIG. 3, an improved sensor module 106 is provided and includes a support structure 108 which retains a pair of magnetic sensors 110 therein. The support structure 108 includes a pair of mounting brackets 112 which allow the sensor module 106 to be substituted for the sensor module 48 of U.S. Pat. No. 3,772,548 by being secured to the suitable bracket assembly 60 disclosed therein. Accordingly, the sensors 110 would be aligned with the rotor ring to provide the desired signals for anti-skid control and speed indication.

A sleeve member 114 is similar to the sleeve member 38 described hereinabove to include a tapered end 116. A sleeve member 114 closely encircles each sensor 110 so that they may be received within a tapered opening 118 of the support structure 108. A spring washer 120 is then positioned around the sensor 110 to make contact with the other end 122 of the sleeve member 114. A cover plate 124 includes a pair of holes 126 therethrough for receiving the sensors 110 and is secured by a bolt 128 to the support structure 108 at a threaded hole 130 therein. The dimensions of the support structure 108, sleeve member 114, and the cover plate 124 are such that the spring washer 120 will apply an axial force to the sleeve member 114 when the bolt 128 is fully received within the hole 130.

When the sensor module 106 is mounted for initial installation, each magnetic sensor 110 is positioned forward of the rotor line 132 prior to the tightening of bolt 128. With each sensor 110 so positioned, bolt 128 can be tightened to generally generate an axial force through the spring washers 120 which will cause the tapered ends 116 to be inwardly wedged by the tapered opening 118 for retention of the sensors 110. The bolt 128 must be fully tightened to generate the axial force for sensor retention at initial installation because the location of the sensor module 106 prevents access thereto after the wheel has been installed.

There is the feature of this embodiment which is not found in the embodiments herein described above. It can be seen, for example, that in configuration of FIG. 3 the tapered end 116 is positioned toward the rotor. From the descriptions provided hereinabove, it would appear that the leading edge of the tapered end 116 would prevent any axial movement of the sensor 110 in a direction generally away from the rotor line 132. However, since the spring washers 120 are provided to basically generate the axial force, it can be seen that axial movement of the magnetic sensor in a direction away from the wheel is allowed. As the wheel is installed, the rotor acts on each sensor 110 to cause it to move inwardly. The initial application of force to the sensor 110 is resisted by the friction created at the leading edge at the tapered end 116. However, this force acts on the entire sleeve member 114 causing it to depress the spring washer 120 thereby releasing the tapered end 116 from the tapered opening 118 to prevent continued wedging contact by the tapered end 116. Without continued wedging contact by the tapered end 116, the friction forces tending to restrict axial movement of the sensor 110 are removed and the sensors 110 are allowed to be positioned as shown in FIG. 3 along the line 132 which represents final rotor position. At this desired position, the sensors 110 are again acted upon by the spring washer 120 and the sleeve member 114 to prevent axial movement toward the rotor. Movement toward the rotor can only tend to further insert the tapered end 116 into the tapered opening 118 to thereby increase the inward wedging of the end 116 toward the sensor 110 to increase frictional contact therebetween.

It can be seen therefore that the configuration shown in FIG. 3 provides a one-way clutch for the magnetic sensors 110 when the retaining force is fully applied. This feature is different from that discussed hereinabove wherein the one-way clutch feature is provided only when the retaining axial force is only partially applied. The method of retention is different from the embodiments shown because of the different requirements for initial installation. The actual difference in retention is accomplished by the fact that the sensor module 106 includes a spring washer at the rearward end 122 of the sleeve member 114 to allow the sleeve member 114 to move axially within the support structure 108 for selective application of retaining force to the sensors 110.

While there has been shown and described hereinabove various preferred embodiments of the invention, it will now be obvious to those skilled in the art that changes and modifications may be made therein without departing from the claimed invention.

We claim:

1. A magnetic sensor mounting device for a wheel speed sensor assembly which said assembly is capable of being installed in association with a wheel rotatably mounted on an axle assembly and includes an annular rotor means mounted relative to said wheel for rotation about its axis corresponding to rotation of said wheel and a generally cylindrical magnetic sensor alignable with said annular rotor means, said magnetic sensor mounting device comprising:

a support structure for said magnetic sensor adapted to be fixedly mounted on said axle assembly in alignment with said annular rotor means;

a resilient plastic sleeve member having a generally cylindrical opening to closely receive said magnetic sensor therein, said sleeve member having an outer surface at a first end thereof which is gradually tapered inwardly;

said support structure having a first end which has an interior surface which is tapered to mate with said outer surface of said first end of said magnetic sensor;

said support structure including means for selectively applying an axial force to said sleeve member when said magnetic sensor is positioned at a predetermined axial location therein to cause said first end of said support structure to inwardly wedge said first end of said sleeve member against said magnetic sensor to produce frictional contact therebetween; and said resilient plastic sleeve member being generally noncompressible to cause only said first end thereof to be deformed inwardly against said magnetic sensor to produce said frictional contact therebetween.

2. A magnetic mounting device as set forth in claim 1, wherein said first end of said sleeve member is remote from said rotor means, a second end of said sleeve member is fixedly located with respect to said axle assembly to prevent its movement toward said rotor means, and an amount of said axial force is applied to said first end toward said rotor means and can be varied by said means for selectively applying said axial force whereby a small said amount of said axial force allows some movement of said magnetic sensor away from said rotor means and a greater said amount of said axial force maintains said magnetic sensor at said predetermined axial location.

3. A magnetic sensor mounting device for a wheel speed sensor assembly which said assembly is capable of being installed in association with a wheel rotatably mounted on an axle assembly and includes an annular rotor means mounted relative to said wheel for rotation about its axis corresponding to rotation of said wheel and a generally cylindrical magnetic sensor alignable with said annular rotor means, said magnetic sensor mounting device comprising:

a support structure for said magnetic sensor adapted to be fixedly mounted on said axle assembly in alignment with said annular rotor means;

a resilient plastic sleeve member having a generally cylindrical opening to closely receive said magnetic sensor therein, said sleeve member having an outer surface at a first end thereof which is gradually tapered inwardly;

said support structure including means for selectively applying an axial force to said sleeve member when said magnetic sensor is positioned at a predetermined axial location therein to inwardly wedge said first end of said sleeve member against said magnetic sensor to produce frictional contact therebetween;

said first end of said sleeve member being remote from said rotor means, a second end of said sleeve member being fixedly located with respect to said axle assembly to prevent its movement toward said rotor means, and said axial force being applied to said first end toward said rotor means whereby a small amount of said axial force allows some movement of said magnetic sensor away from said rotor means and a greater amount of said axial force maintains said magnetic sensor at said predetermined axial location; and said means for selectively applying said axial force including an adjusting nut of said support structure threadably received within a cavity of said support structure which includes said magnetic sensor and said sleeve member therein, said adjusting nut having an opening therethrough to encircle said magnetic sensor and a forward end thereof which is tapered to mate with said first end of said sleeve member, whereby tightening said adjusting nut for contact with said sleeve member causes said axial force to be applied thereto.

4. A magnetic sensor mounting device for a wheel speed sensor assembly which said assembly is capable of being installed in association with a wheel rotatably mounted on an axle assembly and includes an annular rotor means mounted relative to said wheel for rotation about its axis corresponding to rotation of said wheel and a generally cylindrical magnetic sensor alignable with said annular rotor means, said magnetic sensor mounting device comprising:

a support structure for said magnetic sensor adapted to be fixedly mounted on said axle assembly in alignment with said annular rotor means; p a resilient plastic sleeve member having a generally cylindrical opening to closely receive said magnetic sensor therein, said sleeve member having an outer surface at a first end thereof which is gradually tapered inwardly;

said support structure including means for selectively applying an axial force to said sleeve member when said magnetic sensor is positioned at a predetermined axial location therein to inwardly wedge said first end of said sleeve member against said magnetic sensor to produce frictional contact therebetween;

said first end of said sleeve member being remote from said rotor means, a second end of said sleeve member being fixedly located with respect to said axle assembly to prevent its movement toward said rotor means, and said axial force is being applied to said first end toward said rotor means whereby a small amount of said axial force allows some movement of said magnetic sensor away from said rotor means and a greater amount of said axial force maintains said magnetic sensor at said predetermined axial location; and said means for selectively applying said axial force including a cantilever spring of said support structure anchored at one end thereof in fixed relationship to said axial assembly and having an opening in another end thereof which encircles said magnetic sensor and is tapered to mate with said first end of said sleeve member, whereby the location of said one end deflects said cantilever spring to cause said axial force to be applied by said other end to said sleeve member.

5. A magnetic sensor mounting device for a wheel speed sensor assembly which said assembly is capable of being installed in association with a wheel rotatably mounted on an axle assembly and includes an annular rotor means mounted relative to said wheel for rotation about its axis corresponding to rotation of said wheel and a generally cylindrical magnetic sensor alignable with said annular rotor means, said magnetic sensor mounting device comprising:
- a support structure for said magnetic sensor adapted to be fixedly mounted on said axle assembly in alignment with said annuar rotor means;
- a resilient plastic sleeve member having a generally cylindrical opening to closely receive said magnetic sensor therein, said sleeve member having an outer surface at a first end thereof which is gradually tapered inwardly;
- said support structure including means for selectively applying an axial force to said sleeve member when said magnetic sensor is positioned at a predetermined axial location therein to inwardly wedge said first end of said sleeve member against said magnetic sensor to produce frictional contact therebetween; and
- said first end of said sleeve member being positioned toward said rotor means, a second end of said sleeve member being remote from said rotor means, said support structure including a tapered opening mated with said first end of said sleeve member for its receipt therein, and said means for selectively applying said axial force including a spring member of said support structure at said second end of said sleeve member tending to force said first end of said sleeve member into said tapered opening, whereby movement of said magnetic sensor away from said rotor means acts on said sleeve member in opposition to said spring member to release said first end of said sleeve member from said tapered opening to thereby decrease said frictional contact between said magnetic sensor and said sleeve member and movement of said magnetic sensor toward said rotor means will be prevented by said frictional contact to maintain said magnetic sensor at said predetermined axial location.

6. A magnetic sensor mounting device for a wheel speed sensor assembly which said assembly is capable of being installed in association with a wheel rotatably mounted on an axle assembly and includes an annular rotor means mounted relative to said wheel for rotation about its axis corresponding to rotation of said wheel and a generally cylindrical magnetic sensor alignable with said annular rotor means, said magnetic sensor mounting device comprising:
- a support structure for said magnetic sensor adapted to be fixedly mounted on said axle assembly in alignment with said annular rotor means;
- a resilient plastic sleeve member having a generally cylindrical opening to closely receive said magnetic sensor therein, said sleeve member having an outer surface at a first end thereof which is gradually tapered inwardly;
- said support structure including means for selectively applying an axial force to said sleeve member when said magnetic sensor is positioned at a predetermined axial location therein to inwardly wedge said first end of said sleeve member against said magnetic sensor to produce frictional contact therebetween; and
- said first end including at least one slot to accommodate wedging of said sleeve member against said magnetic sensor independently of its diameter at said first end.

7. A magnetic sensor mounting device as set forth in claim 6, wherein said first end of said sleeve member includes additional said slots to be thereby sectioned to allow individual wedging of the sections thereof to accommodate said magnetic sensor which has a non-circular cross-section at said first end.

8. A magnetic sensor mounting device for a speed sensor assembly which said assembly is capable of being installed in association with an element rotatably mounted within a shaft assembly and includes a rotor means mounted relative to said element for rotation about its axis corresponding to rotation of said element and a generally cylindrical magnetic sensor alignable with said rotor means, said magnetic sensor mounting device comprising:
- a support structure for said magnetic sensor adapted to be fixedly mounted on said shaft assembly in alignment with said rotor means;
- a resilient plastic sleeve member having a generally cylindrical opening to closely receive said magnetic sensor therein, said sleeve member having an outer surface at a first end thereof which is gradually tapered inwardly;
- said support structure having a first end which has an interior surface which is tapered to mate with said outer surface of said first end of said magnetic sensor;
- said support structure including a cavity for receipt of said sleeve member therein and means for selectively applying an axial force to said sleeve member when said magnetic sensor is positioned at a predetermined axial location therein to cause said first end of said support structure to inwardly wedge said first end of said sleeve member against said magnetic sensor to produce frictional contact therebetween; and
- said resilient plastic sleeve member being generally noncompressible to cause only said first end thereof to be deformed inwardly against said magnetic sensor to produce said frictional contact therebetween.

9. A magnetic sensor mounting device as set forth in claim 8, wherein said first end of said sleeve member is remote from said rotor means, a second end of said sleeve member is fixedly located with respect to said shaft assembly to prevent its movement toward said rotor means, and an amount of said axle force is applied to said first end toward said rotor means and can be varied by said means for selectively applying said axial force whereby a small said amount of said axial force allows some movement of said magnetic sensor away from said rotor means and a greater said amount of said axial force maintains said magnetic sensor at said predetermined axial location.

10. A magnetic sensor mounting device for a speed sensor assembly which said assembly is capable of being installed in association with an element rotatably mounted within a shaft assembly and includes a rotor means mounted relative to said element for rotation about its axis corresponding to rotation of said element and a generally cylindrical magnetic sensor alignable with said rotor means, said magnetic sensor mounting device comprising:

a support structure for said magnetic sensor adapted to be fixedly mounted on said shaft assembly in alignment with said rotor means;

a resilient plastic sleeve member having a generally cylindrical opening to closely receive said magnetic sensor therein, said sleeve member having an outer surface at a first end thereof which is gradually tapered inwardly;

said support structure including a cavity for receipt of said sleeve member therein and means for selectively applying an axial force to said sleeve member when said magnetic sensor is positioned at a predetermined axial location therein to inwardly wedge said first end of said sleeve member against said magnetic sensor to produce frictional contact therebetween;

said first end of said sleeve member being remote from said rotor means, a second end of said sleeve member being fixedly located with respect to said shaft assembly to prevent its movement toward said rotor means, and said axle force being applied to said first end toward said rotor means whereby a small amount of said axial force allows some movement of said magnetic sensor away from said rotor means and a greater amount of said axial force maintains said magnetic sensor at said predetermined axial location; and said means for selectively applying said axial force including an adjusting nut of said support structure threadedly received within said cavity of said support structure which includes said magnetic sensor and said sleeve member therein, said adjusting nut having an opening therethrough to encircle said magnetic sensor and a forward end thereof which is tapered to mate with said first end of said sleeve member, whereby tightening said adjusting nut for contact with said sleeve member causes said axial force to be applied thereto.

* * * * *